United States Patent [19]

Murib et al.

[11] 3,923,881

[45] *Dec. 2, 1975

[54] PROCESS FOR THE PREPARATION OF C$_4$ DICARBOXYLIC ACIDS FROM 2-BUTENE

[75] Inventors: Jawad H. Murib; Charles E. Frank, both of Cincinnati, Ohio

[73] Assignee: National Distillers and Chemical Corporation, New York, N.Y.

[ * ] Notice: The portion of the term of this patent subsequent to Feb. 12, 1991, has been disclaimed.

[22] Filed: Dec. 28, 1973

[21] Appl. No.: 429,407

Related U.S. Application Data

[63] Continuation-in-part of Ser. No. 197,495, Nov. 10, 1971, Pat. No. 3,792,086, which is a continuation-in-part of Ser. No. 99,283, Dec. 17, 1970, abandoned.

[52] U.S. Cl...... 260/533 R; 260/485 R; 260/486 R; 260/533 N; 260/604 R
[51] Int. Cl.² .............. C07C 51/32; C07C 55/10; C07C 57/14
[58] Field of Search ................ 260/533 N, 533 R

[56] References Cited
UNITED STATES PATENTS 3,293,291  12/1966  Wattimena et al.............. 260/533 R
3,758,551  9/1973  Murib et al..................... 260/533 N
3,792,086  2/1974  Frank et al. .................... 260/533 N

OTHER PUBLICATIONS

C.A. Vol. 71, 1969, 70135n citing UK. Pat. No. 1,154,148, to Friedrichsen et al.

Skinner et al. *Ind. Eng. Chem.* 53 557–558 (1961) C.A. Vol. 55 27054(a), 1961.

*Primary Examiner*—James A. Patten
*Assistant Examiner*—Richard D. Kelly
*Attorney, Agent, or Firm*—Allen A. Meyer, Jr.

[57] ABSTRACT

Process for the preparation of C$_4$ dicarboxylic organic acids such as fumaric and succinic acids as well as mixtures thereof by the catalytic vapor phase oxidation of 2-butene at temperatures of up to 300°C. and in the presence of a catalyst preferably containing phosphoric acid and a catalytically effective amount of a metallic catalyst such as palladium, platinum, rhodium, ruthenium, iridium, copper, silver, gold, cobalt, nickel, chromium and mixtures thereof.

6 Claims, No Drawings

PROCESS FOR THE PREPARATION OF C₄ DICARBOXYLIC ACIDS FROM 2-BUTENE

RELATED APPLICATIONS

This application is a continuation-in-part of U.S. patent application Ser. No. 197,495, filed Nov. 10, 1971 now U.S. Pat. No. 3,792,086, the disclosure of which is incorporated herein by reference; said Ser. No. 197,495 being a continuation-in-part of U.S. patent application Ser. No. 99,283, filed Dec. 17, 1970, which is now abandoned.

BACKGROUND OF THE INVENTION

In general the present invention relates to a process for the preparation of $C_4$ dicarboxylic organic acids by the catalytic vapor phase oxidation of 2-butene. Particular $C_4$ dicarboxylic acids produced in accordance with the process of this invention include fumaric and succinic acids.

These are a number of known processes for the preparation of organic dicarboxylic acids containing four carbon atoms per molecule. Fumaric acid, for example, can be produced by such conventional procedures as fermentation of molasses, thermal or catalytic isomerization of maleic acid, and the catalytic oxidation of benzene or alkylated benzenes. Succinic acid, on the other hand, can be prepared by the fermentation of ammonium tartrate. A number of the aforementioned processes involve multi-step operations and present obvious processing problems.

It is among the objects of the present invention to provide a new and improved process for the selective preparation of $C_4$ dicarboxylic acids by a single-step vapor phase process. Other objects and advantages of the invention will be apparent from consideration of the following detailed description of the preferred forms thereof.

SUMMARY OF THE INVENTION

In accordance with the present invention, 2-butene is oxidized in the vapor phase with molecular oxygen at temperatures of from about 100°C. up to 300°C. and in the presence of a catalyst composition containing phosphoric acid and a catalytically effective amount of at least one metal from a group of metals, to form selectively the desired acid. The process is carried out at elevated temperatures, employing a heterogeneous catalyst contact system, e.g., a system utilizing a fixed, moving or fluidized solid catalyst bed. The reactions thus carried out, employing the process of the invention uses at least one metal selected from the group consisting of palladium, platinum, rhodium, ruthenium, iridium, copper, silver, gold, cobalt, nickel and chromium and mixtures thereof. The direct vapor phase process may be utilized commercially. Carrying out the reaction in gas phase is a relatively simple and efficient operation since no moving parts are required in the processing equipment. Product separation is also simplified since the reaction product is easily separated directly from the reaction mixture by distillation, sublimation and condensation. Further, gas phase reactions generally permit continuous operation and thus do not require the use of expensive, volatile solvents.

The description of the invention and examples of preferred forms thereof relates principally to the oxidation of 2-butene to yield fumaric and succinic acids, with crotonic acid as by by-product. It will, however, be understood that the process described herein is similarly applicable to the vapor phase oxidation of olefins having the formula $CH_3-CR=CR-CH_3$ in which R may be methyl, ethyl, propyl, butyl, phenyl, and the like whereby the corresponding unsaturated acids are obtained. The use of these substituted 2-butenes is embraced within the scope of the present invention.

DESCRIPTION OF THE PREFERRED EMBODIMENTS

The 2-butene used in the present process may be fed in pure form or, alternatively, may be impure in the sense that it may contain minor amounts, e.g., up to about 50 mole percent thereof, of a saturated hydrocarbon vapor such as methane, ethane or propane gas. The oxygen feed may similarly be pure oxygen gas or, alternatively, an oxygen-containing gas mixture such as air or air enriched with oxygen. In addition to these materials the gaseous feed mixture reacted in the process may contain and preferably will contain other inert diluents such as carbon dioxide, nitrogen, water vapor and the like. The gaseous mixture of such reactants is contacted with a catalyst composition comprising phosphoric acid and a catalytically effective amount of the appropriate metal, suitably supported on a conventional catalyst carrier such as, for example, silica, alumina, titania, carborundum, carbon, and ion exchange resin, or the like.

The metal used must be at least one selected from palladium, platinum, rhodium, ruthenium, iridium, copper, silver, gold, cobalt, nickel and chromium. Palladium is the preferred metal catalyst. The catalyst support is impregnated or loaded with the phosphoric acid, and the metal, whether alone or admixed, alloyed or in solid solution with a minor amount of another metal selected from the appropriate group of metals. The selected metal is incorporated in amounts of from about 0.01 to 5 percent, preferably from about 0.1 to 2 percent, by weight of the total catalyst composition. On the other hand, the phosphoric acid is incorporated in amounts of at least about 1 percent and up to as much as about 50 percent, preferably from about 5 to 30 percent, by weight of the total catalyst composition.

Deposition of the catalytically effective amount of catalytic metal utilized in this process may be effected by conventional techniques, such as by contacting the catalyst support with a solution of a suitable metallic salt or complex, e.g., in the case of palladium, palladium chloride, palladium acetate, palladium nitrate or palladium acetylacetonate, and thereafter reducing this palladium compound to the metal with hydrogen or other appropriate reducing agent. Alternatively, the metallic salt may, if desired, be reacted with alkali to form the corresponding oxide and the latter thereafter reduced to the catalytically active metal.

When the catalytic metal is deposited prior to impregnation of the support with phosphoric acid the catalyst metal salt may be applied from either aqueous or organic media, e.g., water or organic solvents such as lower alkanol, e.g., methanol or ethanol, benzene, chloroform, or the like. On the other hand, when the catalytically active metal is deposited on the catalyst support after impregnation of the phosphoric acid, the metal salt is usually applied from an organic solvent. Organic media are preferred for deposition of the catalytically active metal in this alternative embodiment inasmuch as the presence of water may tend to remove a portion of the phosphoric acid from the carrier.

The catalyst carrier is generally loaded with the phosphoric acid by impregnating the support with aqueous solutions of phosphoric acid and subsequently drying the carrier as, for example, in a vacuum oven or in a stream of hot air (100 –200°C.). The impregnated support may thereafter be calcined to improve bonding of the phosphoric acid to the carrier.

Commercially available catalyst materials may also be utilized in the preparation of the catalyst compositions hereof. Thus, for example, either a commercial supported metal catalyst may be treated with phosphoric acid, or a commercial supported phosphoric acid catalyst may have the selected metal deposited thereon, to form catalyst compositions useful for carrying out this invention.

As indicated above, the catalytically effective metal and the phosphoric acid may be deposited on or impregnated in the catalyst carrier in any desired sequence, the combined supported catalyst composition, however formed, being active in the present vapor phase process. The phosphoric acid may also be added continuously to the reaction mixture in the form of an aqueous solution to maintain a trickle liquid phase over the catalyst bed. In this particular embodiment the phosphoric acid in the effluent mixture may be recovered and recycled.

Stoichiometric proportions of the 2-butene and oxygen reactants, viz., 3 moles of oxygen per mole of olefin may be utilized in the vapor phase process hereof. It may be preferred to operate outside flammable ratios of oxygen - 2-butene mixtures and to use reaction mixtures in which either the oxygen or the olefin is the limiting reactant. Water vapor may be used as a diluent to suppress combustion of the 2-butene reactant and products of the reaction. Generally, mixtures are employed in which oxygen is incorporated in amounts of from about 2 to 10 mole percent, in admixture with from about 6 to 30 mole percent of the olefin. Obviously, when inert diluents (i.e., nitrogen and/or water vapor) are present in the reaction mixture, e.g., when the oxygen is added in the form of air, the proportions of the several reactants are correspondingly and may be favorably modified. The 2-butene reactant may be present in amounts of as low as 2 mole percent when the oxygen is introduced as air.

It has been found that selective formation of the desired fumaric and succinic acids may be obtained in accordance with the present invention as substantially low oxidizing temperatures. Thus, the $C_4$ dicarboxylic acids may be obtained at temperatures of as low as 100° and up to 300°C. Higher temperatures may be used if desired.

The reaction temperature employed in the process varies inversely with the contact time employed, it being possible to use higher reaction temperatures when employing shorter contact times and, conversely, lower reaction temperatures at longer contact times. It has thus been found possible to carry out the process of the invention effectively at temperatures of as high as 300°C., using relatively short contact times.

The oxidation process is conducted either at atmospheric or elevated pressures, the use of higher pressures somewhat increasing product conversions. The reaction may thus be effected at pressures of up to about 300 psi. It is, however, generally preferred to carry out the vapor phase process at atmospheric pressure or under pressures only slightly in excess of atmospheric, e.g., up to about 75 psi, to increase both productivity and catalyst efficiency.

After the gaseous reaction mixture contacts the catalyst composition, the exit gases are cooled and scrubbed to facilitate recovery of the various acids. The desired materials may then be separated by any convenient and conventional means such as distillation and/or solvent recovery. Unreacted feed materials separated from the recovered effluent mixture may thereafter be recovered and recycled for further reaction.

The acids and esters which are prepared by the process of this invention find a wide variety of uses in the chemical industry as well as other industries and are widely used in consumer products. For example, fumaric acid is used in the manufacture of polyester resins, in making alkyd resins for paints, varnishes, molding powders and syrups for furniture lacquers and in modifier prints inks, and as an additive for drying oils to improve their drying characteristics. Fumaric acid is also used in foods in small amounts to replace citric and tartaric acids as an acidulant and flavoring agent. It is also used as a mordant, and in making modified phenolic resins. Succinic acid finds use in medicine, in organic synthesis, the manufacture of lacquers, dyes, esters for perfumes, in photography, and as a sequestering agent, a buffer, and a neutralizing agent.

The following example is directed to certain preferred embodiments of the present vapor phase process. In the example, which is intended as illustrative and which should not be construed in a limiting sense, all parts and percentages are given by weight and temperatures in degrees Centigrade unless otherwise specified.

EXAMPLE

A 30 ml Pyrex glass reactor, 12 × 2.5 cm (outside diameter) provided with a thermowell was attached to a preheating zone (1.2 × 15 cm). The reactor was packed with 16.1 g. of catalyst (30 ml bulk volume) containing 1% palladium 2% gold and 25% $H_3PO_4$ supported on silica. A gaseous stream of 10% by volume of butene-2, 18.3% of oxygen and 71.7% of nitrogen was bubbled through liquid water heated at 80°C. The mixed vapors were then fed into the catalyst heated at 186°C. at the rate of 400 cc/min. The reaction mixture was passed through a trap maintained at room temperature. A white crystalline solid condensed at the outlet of the reactor. Analysis by mass spectra and infrared showed that the solid consisted of a mixture of fumaric and succinic acid. The solid melted at 250°C., indicating that it was a mixture of fumaric acid (m.p., 287°C.) and succinic acid (m.p., 185°C.). Titrametric analysis gave a neutralization equivalent corresponding to a content of 98.2% of $C_4$ dibasic acids. Iodimetry gave a molar distribution of 45% fumaric and 55% succinic acid. The liquid condensate collected in the room temperature trap contained crotonic acid, crotonaldehyde with small amounts of acrylic acid and acrolein dissolved in wateer.

The present invention thus provides an improved process for the production of $C_4$ organic dicarboxylic acids by the vapor phase oxidation of 2-butene. While particular embodiments of this invention are shown above, it will be understood that the invention is obviously subject to variations and modifications without departing from its broader aspects. For example, it is possible to carry out the vapor phase oxidation process of this invention in the presence of primary and secondary alcohols or phenols such as t-butanol, methanol, ethanol, n-propanol, butanol, and the like to produce the corresponding esters. When 2-butene is oxidized in the presence of an alcohol under the conditions of the present process, one of the major products is the corresponding maleic acid ester.

What is claimed is:

1. A process for the preparation of $C_4$ dicarboxylic organic acids which comprises oxidizing 2-butene in the vapor phase with molecular oxygen in the presence of a catalyst composition consisting essentially of phosphoric acid and a catalytically effective amount of at least one metal selected from the group consisting of palladium, platinum, rhodium, ruthenium, iridium, copper, silver, gold, cobalt, nickel, chromium and mixtures thereof.

2. The process of claim 1 wherein the catalyst composition is a catalyst carrier having phosphoric acid impregnated therein, and containing a catalytically effective amount of palladium.

3. The process of claim 1 wherein the reaction is carried out at temperatures of from 100° up to 300°C. and under pressures of from atmospheric up to 300 psi.

4. The process of claim 1 wherein the respective materials are reacted in proportions of from 2 to 10 mole % of 2-butene with from 6 to 30 mole % oxygen.

5. The process of claim 1 wherein said catalyst composition contains from about 0.01 to 5 percent by weight of catalytically effective metal and from about 1 to 50 percent by weight of phosphoric acid, based on the weight of the total catalyst composition.

6. A process for the preparation of $C_4$ dicarboxylic organic acids which comprises oxidizing 2-butene with molecular oxygen in the vapor phase and in the presence of a catalytically effective amount of a catalyst consisting essentially of palladium metal, said palladium metal being supported on a carrier impregnated with phosphoric acid, the palladium being present in an amount of from about 0.01 to 5 percent by weight of the total catalyst composition, and the phosphoric acid being present in an amount of at least 1 percent by weight of the total catalyst composition.

* * * * *